United States Patent [19]

Reusser et al.

[11] 4,158,371
[45] Jun. 19, 1979

[54] ASPHALT AND RUBBER COMPRISING COMPOSITION

[75] Inventors: Robert E. Reusser; Lew T. Gray; Oren L. Marrs, all of Bartlesville, Okla.

[73] Assignee: Phillips Petroleum Company, Bartlesville, Okla.

[21] Appl. No.: 864,124

[22] Filed: Dec. 23, 1977

Related U.S. Application Data

[62] Division of Ser. No. 777,216, Mar. 14, 1977, Pat. No. 4,115,335.

[51] Int. Cl.$^2$ ............................ F16L 9/14; B05D 3/02
[52] U.S. Cl. .................................... 138/145; 138/177; 427/374 C; 427/385 R; 428/36
[58] Field of Search ............................... 138/145, 177; 260/28.5 AS, 33.6 AQ; 428/36; 427/374 C, 385 R

[56] References Cited

U.S. PATENT DOCUMENTS

| 4,028,292 | 6/1977 | Korpman | 260/33.6 AQ |
| 4,073,760 | 2/1978 | Harris et al. | 260/28.5 AS |

Primary Examiner—William R. Dixon, Jr.

[57] ABSTRACT

A pipe coating composition is provided having good crack resistance properties that consists essentially of about 50 to 70 wt. % mineral aggregate, about 15 to 35 wt. % finely divided mineral filler, about 5 to 20 wt. % asphalt, about 0.05 to 7 wt. % of a rubbery radial teleblock copolymer, about 0 to 7 wt. % of an oil, and about 0 to 0.5 wt. % of a fibrous material. Further more, the crack resistance of a pipe coating composition is dramatically improved by using an asphalt rubber composition in which the rubber is an epoxy-coupled radial teleblock copolymer as compared to a silicon tetrahalide-coupled radial teleblock copolymer of essentially the same structure.

22 Claims, No Drawings

ASPHALT AND RUBBER COMPRISING COMPOSITION

This application is a division of copending application Ser. No. 777,216, filed Mar. 14, 1977, now U.S. Pat. No. 4,115,335.

This invention relates to rubber asphalt mixtures. More specifically, this invention relates to a composition of matter useful as a pipe coating. Furthermore, this invention relates to a process of coating a pipe.

BACKGROUND OF THE INVENTION

Metal pipes are subjected to corrosion, particularly when they are laid in the ground or in water. It has been described in the art that such pipes can be protected from this corrosion by a protecting coating of asphalt, coated in turn with concrete. Such a coating not only renders the pipe heavy and is difficult to be put on the pipe joint, but the coating is not sufficiently flexible so that cracking may occur during the pipe laying.

An improved technique known in the art provides for a protective coating for pipes that comprises asphalt, sand, limestone dust and asbestos or glass fiber fillers. Whereas such a coating is reported to be more flexible than a concrete coating, it would be desirable to have a coating material available with still further improved crack resistance.

THE INVENTION

It is thus one object of this invention to provide a coating composition with good cracking resistance.

Another object of this invention is to provide a coated pipe with good crack-resistant properties of the coating.

A further object of this invention is to provide a process for coating a pipe with a protective coating in order to reduce the corrosion of such a pipe when laid in the ground or under water.

These and other objects, details, advantages, embodiments and features of this invention will become apparent to those skilled in the art from the following detailed description of the invention and the appended claims.

In accordance with this invention, we have now found that a composition of matter consisting essentially of mineral aggregates, finely divided mineral filler, asphalt, a rubbery radial teleblock copolymer, and optionally oil and fibrous material can be used for coating pipes and said composition exhibits advantageous resistance against cracking.

More specifically, the composition of matter that is provided in accordance with this invention consists of the ingredients listed above within the weight percentage ranges shown in the following table. This table also shows the preferred range of the weight percentages of the individual ingredients.

| Ingredient | Weight Percent Range | Preferred Range |
| --- | --- | --- |
| Mineral aggregate | 50–70 | 55–65 |
| Finely divided mineral filler | 15–35 | 20–30 |
| Asphalt<br>Rubbery radial teleblock copolymer<br>Oil | 5–20 | 8–15 |
| Fibrous material | 0–0.5 | 0.1–0.5 |

In the following by the term "rubber", the rubbery radial teleblock copolymer is meant. This "rubber" comprises as one of the monomers an alkadiene.

As a general rule fibrous material is utilized in the composition of this invention in an amount of 0.05 to 0.5 wt. % and as pointed out above in the table, most preferably in the range of 0.1 to 0.5 wt. %.

It is generally desirable to employ 1 to 20 parts by weight rubber, 0 to 10 parts by weight oil and 70 and 99 parts by weight asphalt based on 100 parts by weight oil, rubber and asphalt. It is preferable, however, to use 1 to 15 parts by weight rubber, 0 to 8 parts by weight oil, and 77 to 99 parts by weight asphalt.

In the composition employing oil, the weight ratio of the alkadiene-based rubber to the oil is preferably in the range of 2/1 to 0.3/1.

The most effective and desirable and therefore preferred amount of oil to be used in a particular coating composition in accordance with this invention is frequently dependent on the type and penetration grade of the asphalt employed. When air-blown or hard asphalt (e.g., an asphalt of less than 25 penetration grade) is employed in the coating, it is generally desirable in order to improve flexibility of the coating to use oil in amounts near the upper limit of the above-given ranges. When conventional asphalts are used, smaller amounts of oil will generally be sufficient to obtain a coating with the desired flexibility. In other words, to obtain comparable coatings from asphalts with different penetration grades, high amounts of oil within the ranges given above are utilized for low penetration grade asphalts, whereas smaller amounts of oil are used for higher penetration grade asphalts. When asphalts of about 100 penetration grade or higher are employed, it is generally desirable particularly in pipe coating compositions to employ little or no oil in the composition in order to obtain the proper balance of flexibility and hardness.

More specifically yet and preferably, the oil will be present in the composition of this invention is a quantity of about 0.5 to 10 weight % when the asphalt used is air-blown or hard asphalt (penetration grade of about 25 or less), in a quantity of about 0 to 10 weight % when the asphalt is an intermediate asphalt of a penetration grade of about 25 to 50 and in a quantity of 0 to 5 weight % for softer asphalts of a penetration grade of about 50 and higher.

In the following, some more details and preferred examples for the various ingredients of the composition defined above for this first embodiment of this invention will be given.

The mineral aggregates, which are useful as the most plentiful ingredient in the composition of this invention, include small crushed rock, gravel and sand. Any size distribution of the aggregate particles which gives a pipeline coating with desired characteristics is within the scope of this invention. In order to obtain a particularly useful density, flexural strength and crack resistance of the coating, it is currently preferred to employ sand which has a particle size distribution such that the sand passes through a screen of about 6 mesh and is retained on a screen of about 100 mesh. Generally about 50 to 90 wt. % of the sand is retained on a 30 mesh screen and from about 10 to 50 wt. % of the sand passes through a 30 mesh screen and is retained on a 100 mesh screen. The mesh numbers refer to the U.S. Standard Sieve Series.

The finely divided mineral filler preferably is a material selected from the group consisting of limestone dust, portland cement, talc and kaolin. It is presently preferred to use limestone dust. The preferred particle size distribution of the finely divided mineral filler, particularly of the limestone dust, is such that about 10 to 50 wt. % of the filler passes through a 100 mesh screen and is retained on a 200 mesh screen, that 45 to 85 wt. % of the filler passes through a 10 mesh screen and is retained on 100 mesh screen, and that 0 to 10 wt. % of the filler is retained on a 10 mesh screen.

The asphalts which can be employed in the pipeline coatings of this invention include conventional petroleum asphalts and air-blown asphalts. The asphalts can be characterized by having penetration grades of up to 250 as measured by ASTM method D5. Currently preferred asphalts include air-blown asphalt of approximately 5 to 25 penetration grade and conventional petroleum asphalts of approximately 25 to 100 penetration grade.

The rubbery teleblock copolymers useful in the compositions of this invention can be broadly characterized as rubbery radial teleblock copolymers of alkadienes having 4 to 8 carbon atoms and vinyl-substituted aromatic monomers having 8 to 12 carbon atoms. The most preferred class of rubbery radial teleblock copolymers are those characterized by the general structure $(A-B)_xY$. In this formula A refers to a non-rubbery end block and B refers to a rubbery polymer block. The central unit Y can be either resulting from a polyfunctional coupling agent or from a multifunctional initiator. The numeral x constitutes an integer of at least 3. The non-rubbery end blocks A can be blocks of vinyl aromatic monomers having 8 to 12 carbon atoms. The rubbery polymer blocks B can be polymers of alkadiene monomers having 4 to 8 carbon atoms or copolymers of such alkadienes with monovinyl-substituted aromatic monomers having 8 to 12 carbon atoms. The weight average molecular weight of the teleblock copolymers that are preferably used in accordance with this invention is in the range of 50,000 to 750,000, and preferably in the range of 75,000 to 400,000.

The most preferred alkadiene-based rubbery polymers are radial teleblock copolymers of the alkadienes defined above and the monovinyl-substituted aromatics defined above, particularly those of 1,3-butadiene and/or isoprene as the conjugated alkadienes and styrene as the monovinyl aromatic monomer. The central unit Y for these radial teleblock copolymers in the composition as defined is preferably a central unit derived from a coupling agent selected from the group consisting of silicon tetrachloride and polyepoxides. The polyepoxides are the most preferred coupling agents for the rubber compositions employed in the mixture of this invention. The radial teleblock copolymers that are preferably used in this invention include those described in the U.S. Pat. No. 3,281,383 and U.S. Pat. No. 3,639,521. Particularly preferred are those radial teleblock copolymers that are based on 1,3-butadiene or isoprene and styrene.

Various oils which are as such well known in the art are useful in the composition of the present invention. The preferred oils include petroleum fractions, generally boiling above 150° C. These fractions should be substantially free of asphaltenes and preferably have a viscosity in the range of 50 to 200 SUS at 100° C. Furthermore, the oil used can be an oil normally used as a rubber extender oil. Generally, a blend of high boiling oils can be used with the provision that these oils are compatible with the alkadiene-based rubber utilized.

The fibrous materials employed in the compositions of this invention include asbestos fibers, glass fibers and synthetic organic fibers. Useful asbestos fibers and glass fibers, for instance, are well known in the art as fillers for various thermoplastic and thermosetting resins. The fibers will generally be employed in a length of about 1 to 15 mm.

The organic fibers that can be included are selected from the group consisting of polyester fibers, polyamide fibers, polyfluoro carbon fibers, poly(arylene sulfide) fibers, and mixtures thereof. These fibers as well as the asbestos fibers and glass fibers are not present in the composition as a supporting web fabric or tape but rather are incorporated into the mastic or composition as a filler material. The small weight percentage of fibers utilized has an important influence on the cracking properties of the composition of this invention.

Examples for polyester fibers are poly(ethylene terephthalate) fibers and poly(1,4-cyclohexanemethylene terephthalate) fibers. Useful polyamide fibers include nylon fibers, such as fibers made of nylon-6 and nylon-6.6. Ohter useful polyamides are polyamides from bis(p-aminocyclohexyl)methane and azelaic acid and polyamides from m-phenylenediamine and isophthalic acid. Examples of useful polyfluorocarbon fibers are poly(tetrafluoroethylene) fibers and fibers from fluorinated ethylene-propylene copolymers. Useful poly(arylene sulfide) fibers are, for example, poly(p-phenylene sulide) fibers. The poly(arylene sulfide) fibers are the preferred synthetic organic fibers in the composition of this invention. These poly(p-phenylene sulfide) fibers are described in detail in the U.S. Pat. Nos. 3,895,091, 3,898,204 and 3,919,177.

Although it is not critical for the purposes of this invention, the synthetic organic fibers if utilized can be employed either as monofilament fibers or as multifilament yarns. For example, the fibers can be introduced into the composition in strands of about 10 to about 100 monofilaments. The fibers will generally have a fiber weight of about 1 to 16 denier, the denier value defining the weight of 9,000 meters of the respective fiber monofilament in grams as usual.

In accordance with another embodiment of this invention, there is provided a pipe which consists essentially of a base pipe and a coating which coating in turn consists essentially of the materials in quantities as defined above. The preferred ingredients and ranges of the composition given above also are preferred for the pipe comprising this coating on the external side of the pipe. This pipe in accordance with this invention is well protected against corrosion and the coating is crack-resistant.

Although various pipes can be coated with the composition of this invention, the presently preferred pipes are steel pipes. Generally the external diameter of these steel pipes is about 2" to about 48" (5 to 125 cm) and the wall thickness of these pipes is about 1/16" to about 2" (1.6 to 51 mm). The thickness of the composition can vary in broad ranges. The thickness of the coating will generally increase with increasing pipe diameter. A good protection of the pipe is generally obtained by a coating on the external surface of the pipe having a thickness of about 0.5 to 40 mm.

In accordance with yet another embodiment of this invention, there is provided a process for the coating of a pipe which comprises mixing the ingredients of the composition of the invention as defined above to form a fluid coating composition and applying this fluid coating composition on the external surface of a pipe. Most preferably the alkadiene-based rubber, the asphalt and the oil (if present) are premixed and also the dry ingredients, namely the mineral filler, the fibrous material (if present) and the aggregate are premixed to form a dry blend. Thereafter the fluid premix of asphalt, oil and rubber and the dry blend are mixed together to provide the coating composition. This coating composition is then applied to the outside of the pipe by standard techniques. The preferred ingredients and ranges are the same for this pipe coating process as those given above in connection with the composition.

It is currently preferred to preblend the oil and rubber prior to mixing it with the asphalt. This premixing of oil and rubber can be achieved by dissolving the rubber in hot oil, for instance at a temperature of 175° to 205° C., or by solution blending the oil and the copolymer followed by stripping the solvent. It is also possible to hot mill the oil into the polymer. The polymer or the preblended mixture of polymer and oil then is dissolved or dispersed in the asphalt by mixing at elevated temperature of, e.g., 175° to 225° C., until a homogeneous mixture is obtained.

The ultimate mixing of the fluid preblend and the dry preblend is preferably done in a pug mill. The temperature for the preheating of the fluid mixture and the ultimate blending step is preferably such that it is below the melting point of the fibrous material. Thus the ultimate blending temperature for blending the fluid preblend and the dry preblend should preferably be in the range of 175° to 260° C.

The composition described can be either applied directly to the pipe or the pipe can be primed. A primer coating on the pipe is preferably an asphalt coating that is applied to the pipe prior to the application of the composition or mastic. This priming is done in order to strengthen the bond between the coating and the pipe. This priming is done by heating the asphalt to a temperature of about 170° to 260° C. and applying a sufficiently fluid asphalt material by standard techniques to the exterior of the pipe. Another possibility of applying an asphalt primer coating is to utilize cutback asphalt and subsequent to the coating step to evaporate the solvent. The primer coating will usually have a thickness of about 0.05 to 1 mm. After the primer coating has been applied, the mastic of the present invention is applied on top. This is preferably done while the primer coating has not yet completely hardened, in other words while the primer coating is still soft. Thereby a strong bond between the protective coating of this invention and the pipe is achieved.

In accordance with a further embodiment of this invention, we have discovered that a mixture of asphalt and a radial teleblock copolymer obtained by coupling living polymers with a polyepoxy coupling agent exhibits a drastically improved crack resistance when employed in a pipe coating composition as compared to the same mixture of asphalt and rubber in which the radial teleblock rubber is, however, coupled with silicon tetrahalide instead of the polyepoxy coupling agent. Thus in accordance with this further embodiment a composition of matter is provided comprising asphalt and a radial teleblock copolymer having the general formula $(A-B)_xY$ wherein A constitutes a non-rubbery end block and B constitutes a rubbery block obtained by polymerizing alkadiene monomers of 4 to 8 carbon atoms optionally also containing monovinyl-substituted aromatic monomers of 8 to 12 carbon atoms having the vinyl radical attached to the aromatic ring, and x is an integer 3 or more, preferably of 3 to 8. The residue Y refers to a central unit of the polymer molecule that is derived from a coupling agent containing at least three epoxy groups per molecule. The preferred coupling agents from which the radical Y is derived are epoxidized soybean oil, epoxidized liquid polybutadiene, 1,2,5,6,9,10-triepoxydecane, and the like. The preferred teleblock copolymer is characterized by the fact that the block A is a polystyrene block and the block B is a rubbery homopolymer block of butadiene and/or isoprene. The weight average molecular weight of the specific radial teleblock copolymer utilized in the composition of this invention lies in the range of around 300,000 to 310,000.

The most preferred composition of this invention consists of mineral aggregate, finely divided mineral filler, asphalt, oil (optionally) and fibrous material (optionally) as defined above and the rubbery teleblock copolymer of this last-mentioned preferred embodiment, i.e. the rubbery teleblock copolymer having a central unit Y in the molecule derived from an epoxy coupling agent having at least 3, and preferably 3 to 8, epoxy groups per molecule. This composition constitutes an excellent pipe coating material with largely improved crack resistance. This material is, therefore, particularly useful in pipe coating compositions to cover pipes that are being laid in the ground or under water.

The invention will be yet more fully understood from the following examples that are intended to illustrate the preferred embodiments of this invention but not to limit the scope thereof unduly.

EXAMPLE I

Mastic compositions were prepared in this example in accordance with the following general recipe:

Recipe

| Component | Parts by Weight |
|---|---|
| Sand | 59.5 |
| Limestone | 28.2 |
| Fiber glass[1] | 0.2 |
| Asphalt<br>Radial teleblock copolymer[2]<br>Oil[3], optional | 12.1 to 13.6 |

[1]Owens-Corning Chopped Continuous Strand JTX-7048, 6.5 mm length.
[2]Proportion of asphalt, copolymer and oil is variable.
[3]An asphalthene-free petroleum fraction.

The sand employed in the above recipe had a particle size distribution as follows:

| Screen Size, Mesh[1] | | |
|---|---|---|
| Passing Through | Retained on | Weight Percent |
| 6 | 8 | 29 |
| 8 | 16 | 36 |
| 16 | 30 | 19 |
| 30 | 50 | 9 |
| 50 | 100 | 7 |

[1]U.S. Standard Sieve Series.

The limestone employed in the above recipe had the following particle size distribution:

| Screen Size, Mesh | | |
|---|---|---|
| Passing Through | Retained on | Weight Percent |
| | 10 | 10 |
| 10 | 20 | 10 |
| 20 | 50 | 30 |
| 50 | 60 | 0 |
| 60 | 100 | 25 |
| 100 | | 25 |

In those runs where oil was used, the radial teleblock copolymer and the oil were mixed by either solution blending in cyclohexane, followed by steam stripping to remove the cyclohexane or by dissolving the copolymer in stirred oil at elevated temperatures. In this example an air-blown asphalt of 15 to 17 penetration grade was utilized.

The copolymer or the copolymer/oil blend was dispersed in the asphalt by stirring and heating the mixture to 205° C. Sand, limestone and glass fibers were manually mixed at room temperature to obtain a preblend. This preblend was heated to about 200° C. and mixed manually into the asphalt/copolymer/oil premix at 205° C. The resulting hot mastics were placed in molds 13 cm×2.5 cm×0.65 cm and molded at 190° C. and 13 700 kPa for 5 minutes. The samples were evaluated by standard techniques and the results obtained are shown in the following table.

15 to 17, together with a rubber that is an oil-extended rubber, results in an advantageous coating having a higher crack time and thus being more crack-resistant than the coating of comparative Run 1. In the case where the composition contained only the hard asphalt and the rubber but no oil, the composition and crack properties are less desirable.

EXAMPLE II

Example I was essentially repeated with the same asphalt utilizing, however, different rubbers. The purpose of this example is to show the difference in behavior of two very closely related rubbers that differ only in the central unit abbreviated Y above and resulting from the coupling agent. The rubber 414 refers to a silicon tetrachloride-coupled radial teleblock copolymer, whereas the rubber 414-P refers to the same rubber coupled, however, with epoxidized soybean oil. The results obtained are shown in the following Table II.

TABLE II[1]

| Run No. | Copolymer Type | Amt | Oil Type | Amt | Premix, PBW | Crack Time, Sec. | Flex. Str. PSI | Flex. Mod., PSI × 10$^{-3}$ | Tensile Str. PSI | Depression % |
|---|---|---|---|---|---|---|---|---|---|---|
| 7 | 414[12] | 5 | | 0 | 12.1 | 24.3 | 891 | — | — | — |
| 8 | 414 | 10 | | 0 | 12.1 | 18 | 1051 | 48.1 | — | — |
| 9 | 414-P[13] | 5 | | 0 | 12.1 | 36 | 819 | 27.4 | — | 4.9 |
| 10 | 414-P | 10 | | 0 | 12.1 | 35 | 773 | — | — | — |
| 11 | 414 | 1.5 | SE[14] | 3.5 | 12.1 | 48 | 721 | — | 103 | 12.1 |
| 12 | 414 | 3 | SE | 7 | 12.1 | 56 | 721 | 28.2 | 87 | 6.8 |
| 13 | 414-P | 1.5 | SE | 3.5 | 12.1 | 54 | 745 | 23.6 | — | — |
| 14 | 414-P | 3 | SE | 7 | 12.1 | 53 | 648 | — | — | 8.2 |
| 14A | — | — | SE | 6.6 | 12.1 | 46 | 655 | 9.6 | — | — |

[1]15–17 Penetration grade air-blown asphalt.
[12]60/40 Butadiene/styrene radial teleblock copolymer coupled with silicon tetrachloride.
[13]60/40 Butadiene/styrene radial teleblock copolymer coupled with epoxidized soybean oil.
[14]SO$_2$ extract oil.

This example shows that with the hard 15 to 17 penetration grade asphalt a considerable improvement is achieved with the particular rubber obtained by coupling with an epoxidized soybean oil. The advantages in crack time obtained with this rubber are considerably superior to the results obtained with a composition containing essentially the same rubber that has, however, been coupled with silicon tetrachloride. This is a very surprising result. The data also show that the incorporation of oil in the composition of this invention

TABLE I[1]

| Run No. | Copolymer Type | Amt[2] | Oil Type | Amt[2] | Premix[3] PRW | Crack Time, Sec.[4] | Flex. Str., PSI[5] | Flex. Mod.[5] PSI × 10$^{-3}$ | Tensile Str., PSI[6] | Depression %[7] |
|---|---|---|---|---|---|---|---|---|---|---|
| 1 | | 0 | | 0 | 12.1 | 32 | 921 | 40.2 | 165 | 4.0 |
| 2 | 411[8] | 5 | | 0 | 12.1 | 17 | 1040 | 86.7 | —[10] | — |
| 3 | 411 | 10 | | 0 | 12.1 | 19 | 787 | 38.9 | — | — |
| 4 | 411 | 3.3 | N[9] | 1.7 | 12.1 | 47 | 712 | 23.3 | 117 | 3.4 |
| 5 | 411 | 6.7 | N | 3.3 | 13.2 | 33 | 578 | 14.3 | — | — |
| 6 | 411 | 13.3 | N | 6.7 | 13.2 | 63 | 393 | 10.7 | 157 | — |

[1]15–17 Penetration grade air-blown asphalt.
[2]Weight percent of copolymer or oil in asphalt/copolymer optional oil premix.
[3]Parts by weight of asphalt/copolymer/optional oil is mastic of above-described recipe.
[4]Determined on molded bars 13 cm × 2.5 cm × 0.65 cm using Instron Testing Machine. Bars were placed on supports 10.2 cm apart. Load was applied to center of test bar using 1.9 cm diameter mandrel at a rate of 0.5 cm/min. Crack time was recorded as time in seconds for initial crack formation.
[5]Flexural strength and flexural modulus determined from stress-strain curve obtained in crack time test (footnote 4) using formulas outlined in ASTM D-790.
[6]Tensile strength determined on molded briquettes (molded as per ASTM C-190) using Instron Testing Machine at a pull rate of 0.5 cm/min. Calculated as tensile strength (in psi) = $\frac{a}{W \times d}$ where a = maximum stress (in lbs.), W = sample width (in inches) and d = sample thickness (in inches).
[7]Measured at 10 hours as described in "Asphalt Protective Coatings for Pipelines", The Asphalt Institute, Third Ed., June, 1972, Specification Series No. 7 (SS-7), page 28.
[8]70/80 Butadiene/styrene radial teleblock copolymer coupled with silicon tetrachloride.
[9]Naphthenic extender oil.
[10]Dash (—) denotes not determined.

The results of the above-shown table indicate that the fairly hard, air-blown asphalt of the penetration grade for the low penetration grade asphalt, namely the air-blown 15 to 17 penetration grade asphalt, is desirable and results in particularly improved crack resistance properties.

Run 14A is included to show the effect of the use of oil without rubber in the coating. The oil provides some improvement over asphalt alone in the coating in crack time (Run 1 vs. Run 14A). The combination of oil and rubber (Run 12) provides an unexpectedly large increase in crack time which would not have been predicted from the results using rubber along (Run 7 or 8) or oil alone (Run 14A).

EXAMPLE III

Example I was essentially repeated utilizing the same 15 to 17 penetration grade asphalt (an air-blown asphalt). This example is given in order to show the effect of a linear teleblock copolymer as compared to a radial teleblock copolymer. The results obtained are shown in the following Table III.

TABLE III[1]

| Run No. | Copolymer Type | Amt | Oil Type | Amt | Premix PBW | Crack Time, Sec. | Flex. Str., PSI | Flex. Mod. PSI × $10^{-3}$ | Tensile Str.,PSI | Depression % |
|---|---|---|---|---|---|---|---|---|---|---|
| 15 | 416[2] | 5 | | 0 | 12.1 | 40 | 989 | 34.3 | 155 | 2.1 |
| 16 | 1102[3] | 5 | | 0 | 12.1 | 28 | 966 | 35.0 | 205 | 1.9 |

[1]15–17 Penetration grade air-blown asphalt.
[2]70/30 Butadiene/styrene radial teleblock copolymer coupled with silicon tetrachloride.
[3]73/27 Butadiene/styrene linear teleblock copolymer.

The results of this example shown in the above Table III demonstrate another surprising result. The linear copolymer of comparative Run 16 results in a composition having less desirable cracking characteristics than the radial teleblock copolymer of Run 15. Both polymers are closely related and thus differ in the fact that the linear polymer of Run 16 is non-branched, whereas the radial teleblock copolymer of Run 15 is branched, i.e. has 3 or more polymer chains attached to a central unit with styrene blocks at the free polymer ends.

EXAMPLE IV

The operation of Example I was essentially repeated utilizing, however, a 40-50 penetration grade asphalt. This is a softer asphalt than the 15-17 penetration grade material. No oil was used in the runs of this example. The rubbery polymer material used in the Runs 18-23 of this example were the same as those used in Runs 11-14 of Example II and Runs 15 and 16 of Example III. The compositions made were again tested in the way described and the results obtained are shown in the following Table IV.

TABLE IV[1]

| Run No. | Copolymer Type | Amt | Premix PBW | Crack Time, Sec. | Flex. Str.,PSI | Flex. Mod. PSI × $10^{-3}$ | Tensile Str.,PSI | Depression % |
|---|---|---|---|---|---|---|---|---|
| 17 (Comp.) | | 0 | 12.1 | 60 | 906 | 33.1 | 61 | 64.8 |
| 18 | 414 | 5 | 12.1 | 76 | 974 | 28.1 | 77 | 35.8 |
| 19 | 414 | 10 | 12.8 | 73 | 617 | 12.2 | 110 | 6.9 |
| 20 | 414-P | 5 | 12.1 | 71 | 824 | 26.1 | — | 6.7 |
| 21 | 414-P | 10 | 12.1 | 118 | 598 | 13.4 | 91 | 5.3 |
| 22 | 416 | 10 | 12.1 | 66 | 812 | — | 111 | 18.0 |
| 23 | 1102 | 10 | 12.1 | 63 | 700 | — | 95 | 19.1 |

[1]40–50 penetration grade asphalt.

The results of this example show that the compositions of this invention provide improved crack properties. Furthermore, the results show that the radial teleblock copolymer has an advantage over the linear teleblock copolymer in a composition as defined. At the same time the composition incorporating the radial teleblock (Run 22) shows less deformation than the composition incorporating the linear teleblock (Run 23). The deformation expressed as the depression in the above-shown tables is a measure of the amount of deformation expected if the coated pipes were subjected to external pressure, for instance when these pipes are stacked on top of each other. The reduction in deformation or depression for all of the compositions containing the rubber as compared to the composition containing no rubber is particularly significant.

EXAMPLE V

The operation of Example I was repeated utilizing in this example a yet softer asphalt, namely an 85-100 penetration grade asphalt. The compositions of this invention are again compared with the same composition containing, however, no rubbery polymer. The results of these comparative runs are shown in the following Table V.

TABLE V[1]

| Run No. | Copolymer Type | Amt | Oil Type | Amt | Premix PBW | Crack Time,Sec. | Flex. Str.,PSI | Flex.Mod. PSI × $10^{-3}$ | Tensile Str.,PSI | Depression % |
|---|---|---|---|---|---|---|---|---|---|---|
| 24 (Comp.) | | 0 | | 0 | 12.1 | 54 | 662 | 28.0 | 39 | 48.8 |
| 25 | 414 | 5 | | 0 | 12.1 | 94 | 592 | 20.1 | 36 | — |
| 26 | 411 | 5 | | 0 | 12.1 | 103 | 424 | 12.3 | — | — |
| 27 | 414 | 3 | SE[2] | 7 | 12.1 | 184 | 178 | 5.4 | — | — |
| 28 | 411 | 3 | SE | 7 | 12.1 | 147 | 139 | 4.0 | — | — |

[1]85-100 Penetration grade asphalt.
[2]$SO_2$ extract oil.

The results shown in this table again demonstrate that the incorporation of the specific rubbery copolymer considerably improves the crack properties of a similar composition containing, however, no such rubbery copolymer. The results in the table furthermore demonstrate that the incorporation of the rubber in the composition results in a more flexible material. The additional incorporation of oil in this composition containing the 85-100 penetration grade asphalt shows a further improvement in the cracking time, reducing, however, the flexural strength and modulus to a degree which is approaching the limit of utility of the so defined composition as a pipeline coating.

EXAMPLE VI

The following runs have been made to illustrate the use of the compositions of this invention in connection with pipe coating applications. Sections of steel pipe having an external diameter of 31 cm and a length of 9.8 to 12.2 meters were grit-blasted and coated with a 0.025 mm thick layer of cutback asphalt primer. Prior to application of the primer, the pipes were heated to 38°-52° C.

Mastics were prepared in accordance with the recipe shown in Example I with 12.1 parts by weight of asphalt/copolymer/oil (if present) premix. The premix preheated to 177°-210° C. and the preblend of sand-/limestone/glass fibers preheated at 190°-205° C. were metered into a pug mill that was maintained at a temperature of about 150°-175° C. for mixing to an extrudable consistency. This hot mastic was passed directly to a pipe coating extruder where it was extruded under pressure onto the primed pipe to a thickness of 1.25 cm.

The so prepared coated pipes were then tested in order to determine the impact strength of the coatings. The impact strength was recorded as the number of drops of a 12.5 kilogram weight from 0.92 meters height required to crack the coating. The tests conducted under a temperature of 3° C. were carried out several days after the coating operation, whereas the testing of the impact strength at 20° C. was conducted about 3 weeks after the coating operation. The results are shown in the following Table IV.

TABLE VI

| Run No. | Asphalt (penetration) | Polymer Type | Amt[2] | Oil Type | Amt[2] | Impact Strength 3° C. | 20° C. |
|---|---|---|---|---|---|---|---|
| 29 (Comp.) | 15-17[1] | 0 | | 0 | | 1 | 2 |
| 30 | " | 414 | 3 | SE | 7 | 5 | 8 |
| 31 | " | 411 | 3.3 | N | 1.7 | 4 | 10 |
| 32 | 40-50 | 414-P | 10 | | 0 | 10 | 10 |

[1]Air-blown, same asphalt as in Example 1.
[2]Parts by weight with the provision that the total of asphalt, polymer and oil is 100 parts by weight.

The above data demonstrate that the coating composition of Run 29 is considerably improved by incorporating the specific rubbery copolymers in the quantities given.

Reasonable variations and modifications which will become apparent to those skilled in the art can be made in this invention without departing from the spirit and scope thereof.

We claim:
1. A pipe consisting essentially of a base pipe and a coating, said coating in turn consisting essentially of
   a. about 50 to 70 wt. % of a mineral aggregate,
   b. about 15 to 35 wt. % of a finely divided mineral filler,
   c. about 5 to 20 wt. % of asphalt,
   d. about 0.05 to 7 wt. % of a rubbery radial teleblock copolymer,
   e. about 0 to 7 wt. % of oil,
   f. about 0 to 0.5 wt. % of a fibrous material.
2. A pipe in accordance with claim 1 wherein said coating comprises 0.05 to 0.5 wt. % of a fibrous material.
3. A pipe in accordance with claim 2 wherein said fibrous material is glass fiber material.
4. A pipe in accordance with claim 1 said coating comprising
   a. about 55 to 65 wt. % of a mineral aggregate,
   b. about 20 to 30 wt. % of a finely divided mineral filler,
   c. about 8 to 15 wt. % of asphalt,
   d. about 0.2 to 5 wt. % of a rubbery radial teleblock copolymer,
   e. about 0 to 5 wt. % of an oil,
   f. about 0.1 to 0.5 wt. % of a fibrous material.
5. A pipe in accordance with claim 1 wherein the ratio of the alkadiene-based rubbery polymer to the oil is in the range of 2/1 to 0.3/1.
6. A pipe in accordance with claim 1 wherein the total weight of the rubbery radial teleblock copolymer and oil is about 1 to 30 wt. % of the total weight of the rubbery radial teleblock copolymer, the oil and the asphalt taken together.
7. A pipe in accordance with claim 1 wherein said rubbery radial teleblock copolymer is a polymer of one or more alkadienes having 4 to 8 carbon atoms and one or more vinyl-substituted aromatic monomers having 8 to 12 carbon atoms.
8. A pipe in accordance with claim 7 wherein said rubbery radial teleblock copolymer has the general formula $(A-B)_xY$ wherein A constitutes a non-rubbery block, B constitutes an alkadiene-based rubbery block, x is an integer of at least 3 and Y is a part of the molecule that is derived from either a multifunctional initiator or from a multifunctional coupling agent.
9. A pipe in accordance with claim 8 wherein A is a polystyrene block, B is a rubbery polymer segment selected from the group consisting of polyalkadiene and copolymers of alkadienes and monovinyl-substituted arenes, and wherein Y is a molecular configuration derived from a multifunctional coupling agent.
10. A pipe in accordance with claim 9 wherein Y is a portion of the molecule derived from a coupling agent containing at least 3 epoxy groups.
11. A process for coating a pipe comprising
   a. mixing the following ingredients to form a fluid composition;
      about 50 to 70 wt. % of a mineral aggregate,
      about 15 to 35 wt. % of a finely divided mineral filler, about 5 to 20 wt. % of asphalt,
      about 0.05 to 7 wt. % of a rubbery radial teleblock copolymer,
      about 0 to 7 wt. % of oil,
      about 0 to 0.5 wt. % of a fibrous material,
   b. applying such fluid composition to the external surface of a pipe,
   c. letting the composition harden on said pipe to form a solid coating.
12. A process in accordance with claim 11 wherein the ingredients to form said fluid composition comprise 0.05 to 0.5 wt. % of a fibrous material.
13. A process in accordance with claim 12 wherein said fibrous material is glass fiber material.
14. A process in accordance with claim 11 wherein said ingredients comprise
   a. about 55 to 65 wt. % of a mineral aggregate, b. about 20 to 30 wt. % of a finely divided mineral filler,
c. about 8 to 15 wt. % of asphalt,
d. about 0.2 to 5 wt. % of a rubbery radial teleblock copolymer,
e. about 0 to 5 wt. % of an oil,
f. about 0.1 to 0.5 wt % of a fibrous material.

15. A process in accordance with claim 11 wherein the weight ratio of the alkadiene-based rubbery polymer to the oil is in the range of 2/1 to 0.3/1.

16. A process in accordance with claim 11 wherein the total weight of the rubbery alkadiene-based polymer and oil is about 1 to 30 wt. % of the total weight of the rubbery teleblock copolymer, the oil and the asphalt taken together.

17. A process in accordance with claim 11 wherein said rubbery teleblock copolymer is a polymer of one or more alkadienes having 4 to 8 carbon atoms and one or more vinyl-substituted aromatic monomers having 8 to 12 carbon atoms.

18. A process in accordance with claim 17 wherein said rubbery radial teleblock copolymer has the general formula $(A-B)_x Y$ wherein A constitutes a non-rubbery block, B constitutes an alkadiene-based rubbery block, x is an integer of at least 3 and Y is a part of the molecule that is derived from either a multifunctional initiator or from a multifunctional coupling agent.

19. A process in accordance with claim 17 wherein A is a polystyrene block, B is a rubbery polymer segment selected from the group consisting of polyalkadiene and copolymers of alkadienes and monovinyl-substituted arenes, and wherein Y is a molecular configuration derived from a multi-functional coupling agent.

20. A process in accordance with claim 11 comprising
a. premixing said rubbery teleblock copolymer, said oil and said asphalt to form a fluid mixture,
b. premixing said mineral aggregate, said finely divided mineral filler and said fibrous material to form a dry mixture,
c. blending said fluid mixture and said dry mixture to obtain said fluid coating composition.

21. A process in accordance with claim 20 wherein said coating composition is applied to said pipe in a thickness of about 0.5 to 40 mm.

22. A process in accordance with claim 20 wherein said premix of (a) comprises
70–99 parts by weight of asphalt,
0–10 parts by weight of an oil, and
1 to 20 parts by weight of a rubbery radial teleblock copolymer.

* * * * *